United States Patent
Troitski

(10) Patent No.: US 6,946,619 B2
(45) Date of Patent: Sep. 20, 2005

(54) METHOD AND LASER-COMPUTER SYSTEM FOR PRODUCING LASER-INDUCED HOLOGRAMS

(75) Inventor: Igor Troitski, Henderson, NV (US)

(73) Assignee: Troitski, Henderson, NV (US)

( * ) Notice: Subject to any disclaimer, the term of this patent is extended or adjusted under 35 U.S.C. 154(b) by 0 days.

(21) Appl. No.: 10/713,817

(22) Filed: Nov. 17, 2003

(65) Prior Publication Data

US 2005/0103762 A1    May 19, 2005

(51) Int. Cl.$^7$ ............................................. B23K 26/00
(52) U.S. Cl. ............................. 219/121.69; 219/121.68
(58) Field of Search ...................... 219/121.68, 121.69; 359/1, 10, 25, 35

(56) References Cited

U.S. PATENT DOCUMENTS

| | | | |
|---|---|---|---|
| 5,383,038 A | 1/1995 | Lawandy et al. ............... 359/7 |
| 5,759,721 A | 6/1998 | Dhal et al. ...................... 430/1 |
| 6,087,617 A | 7/2000 | Troitski et al. ........... 219/121.6 |
| 6,160,645 A | 12/2000 | Chandross et al. ............ 359/3 |
| 6,166,835 A * | 12/2000 | Yang ............................ 359/22 |
| 6,291,797 B1 * | 9/2001 | Koyama et al. ....... 219/121.73 |
| 6,322,958 B1 | 11/2001 | Hayashi ........................ 65/111 |
| 6,333,486 B1 | 12/2001 | Troitski ................. 219/121.69 |
| 6,388,780 B1 * | 5/2002 | Monaghan et al. ........... 359/35 |
| 6,392,683 B1 | 5/2002 | Hayashi ...................... 347/224 |
| 6,399,914 B1 | 6/2002 | Troitski ................. 219/121.69 |
| 6,417,485 B1 | 7/2002 | Troitski ................. 219/121.69 |
| 6,426,480 B1 | 7/2002 | Troitski ................. 219/121.68 |
| 6,489,065 B1 | 12/2002 | Dhal et al. ..................... 430/2 |
| 6,490,299 B1 | 12/2002 | Raevski et al. ............... 372/10 |
| 6,509,548 B1 | 1/2003 | Troitski ................. 219/121.69 |
| 6,558,788 B1 | 5/2003 | Butler et al. ................. 428/336 |
| 6,558,851 B1 | 5/2003 | Fjeldstad et al. .............. 430/1 |
| 6,567,193 B2 * | 5/2003 | Monaghan et al. ........... 359/35 |
| 6,605,797 B1 | 8/2003 | Troitski ................. 219/121.69 |
| 6,630,644 B2 | 10/2003 | Troitski et al. ........ 219/121.69 |
| 2003/0118915 A1 * | 6/2003 | Yokozawa ..................... 430/1 |

* cited by examiner

Primary Examiner—Geoffrey S. Evans

(57) ABSTRACT

This invention provides methods and apparatus for producing holograms by creating arrangement of laser-induced damages inside transparent materials. A method for transformation of an interference pattern into arrangement of points so that laser-induced damages created at these points are able to reconstruct high quality holographic images is disclosed. A method and apparatus for creation of small laser-induced damages needed for reproduction of holograms by transforming wavelength of laser radiation generating breakdowns at the predetermined points of transparent materials are described.

12 Claims, 1 Drawing Sheet

METHOD AND LASER-COMPUTER SYSTEM FOR PRODUCING LASER-INDUCED HOLOGRAMS

FIELD OF THE INVENTION

The present invention relates to a method and apparatus for producing an arrangement of laser-induced damages inside a transparent material, and more particularly, for creating an arrangement of laser-induced damages, which reproduce interference pattern corresponding given hologram. In general, the invention relates to methods, in which laser energy is utilized to generate laser-induced damages based on the breakdown phenomenon.

BACKGROUND OF THE INVENTION

Present-day laser-induced damage technology gives a chance to produce many laser-induced damages of small sizes and smoothed shapes for short time. It gives a chance to reproduce high quality images inside transparent materials.

U.S. Pat. No. 6,322,958 to Hayashi; U.S. Pat. No. 6,333,486 to Troitski; U.S. Pat. No. 6,392,683 to Hayashi; U.S. Pat. No. 6,399,914 to Troitski; U.S. Pat. No. 6,417,485 to Troitski; U.S. Pat. No. 6,426,480 to Troitski; U.S. Pat. No. 6,490,299 to Raevsky et al. and U.S. Pat. No. 6,509,548 to Troitski disclose methods and apparatus for creation of small laser-induced damages of smoothed shapes.

U.S. Pat. No. 6,322,958 to Hayashi discloses a laser marking method and apparatus comprising focusing the laser beam radiated from the laser source at a converging point inside of a work member to form cracks of specific forms.

U.S. Pat. No. 6,333,486 to Troitski discloses a method and system for production of laser induced damage by generating breakdowns in several separate focused small points inside the etch point area.

U.S. Pat. No. 6,392,683 to Hayashi discloses a laser marking method wherein the split plurality of laser beams are focused onto a very small region of the inner portion of the object to be marked so as to cause degeneration of the very small region of the object to be marked.

U.S. Pat. No. 6,399,914 to Troitski discloses a method for creating laser-induced damages with reduced sharp star structure comprising: production of the special transparent material by introducing special kinds of impurities; and generating laser radiation and focusing it at predetermined points of said material so that the focal spot area contains at least one said impurity and laser energy exceeds the damage threshold of said material with the impurities at the focal area by a negligible amount.

U.S. Pat. No. 6,417,485 to Troitski discloses a method for creating laser-induced damages of smoothed shapes by controlling breakdown process development comprising: generating laser radiation having sufficient energy to induce a plasma condition at a point in said material; and directing said laser radiation at said point to generate said plasma condition and thereafter maintain said condition until sufficient total energy has been delivered to said material so that a resultant damage area of the desired sizes will be created.

U.S. Pat. No. 6,426,480 to Troitski discloses a method for creating small smoothed laser-induced damages of determined sizes with controlling their brightness without variation of their determined sizes.

U.S. Pat. No. 6,490,299 to Raevsky et al. discloses a method and laser system for producing laser-induced damages without star structure by specific laser radiation, which is the serial combination of both generation regimes: a Q-switched mode and a free-running mode.

U.S. Pat. No. 6,509,548 to Troitski discloses a method for creating small laser-induced damages, which is based on generation of the initial electron density in the relatively large volume, creation of the breakdown at a small part of the said volume and control of the energy amount enclosed inside the plasma.

U.S. Pat. No. 6,087,617 to Troitski, et al.; U.S. Pat. No. 6,605,797 to Troitski; U.S. Pat. No. 6,630,644 to Troitski, et al disclose methods and laser-computer graphics systems, which provide the creation of such laser-induced damage arrangements, which on the one hand, reproduce desirable information about given images and on the other hand, the arrangements do not give internal crash of the used transparent material.

U.S. Pat. No. 6,087,617 to Troitski, et al. discloses a computer graphics system for generates an arrangement of the potential etch points. The arrangement is based on the characteristics of the selected optically transparent material so if the number of the potential etch points exceeds a predetermined number, the system carries out an optimization routine that allows the number of the generated etch points to be reduced based on their sizes.

U.S. Pat. No. 6,630,644 to Troitski discloses a laser-computer graphics system for generating an arrangement of laser-induced damages, which enables to produce image with high resolution like a computer graphic image from which it is derived, with little fluctuation in gray shades, and without star point structure.

U.S. Pat. No. 6,630,644 to Troitski, et al. discloses a method for creating arrangement of damages for production of 3D laser-induced damage portrait with the space resolution, which is equal to the appropriate computer 3D model.

So Patents mentioned above disclose methods for creating an arrangement of laser-induced damages, which enables to reproduce high quality image inside transparent materials. One of the purposes of the present invention is disclose a method for creating an arrangement of small laser-induced damages to reproduce an interference pattern corresponding to the given hologram.

A number of materials for recording and reproducing holograms are also well known.

For example, U.S. Pat. No. 5,383,038 to Lawandy, et al. discloses a method for creating holographic optical memory using semiconductor microcrystallite doped glasses by the simultaneous injection of fundamental and second harmonic fields. More specifically, the disclosure pertains to a structure that exhibits SHG, the structure being comprised of, by example, borosilicate glass that contains $CdS_xSe_{1-x}$ microcrystallites.

U.S. Pat. No. 5,759,721 to Dhal, et al. discloses a holographic recording medium comprising an acid generator capable of producing an acid upon exposure to actinic radiation; a binder; and at least one monomer or oligomer capable of undergoing cationic polymerization initiated by the acid produced from the acid generator.

U.S. Pat. No. 6,160,645 to Chandross, et al. discloses a holographic medium, which uses a photosensitive polymer medium. The shelf life of the photosensitive polymer medium is improved by hermetically sealing the polymer between glass plates.

U.S. Pat. No. 6,489,065 to Dhal, et al. discloses a holographic recording medium comprises (a) an acid generator capable of generating an acid upon exposure to actinic radiation; and (b) a polymer comprising a plurality of high refractive index moieties, a plurality of low refractive index moieties, and a plurality of acid-sensitive linking groups connecting the high and low refractive index moieties.

U.S. Pat. No. 6,558,788 to Butler, et al. discloses a transfer film for holographic images which is a multilayer structure including a core and at least one outer layer having a sufficient thickness for receiving a holographic image impressed into it.

U.S. Pat. No. 6,558,851 to Fjeldstad, et al. discloses optical medium for registration of holographic interferograms, where the media consists of three transparent layers where the bottom layer is a glass substrate, the mid layer is an electro-conductive film of tin dioxide, and the top layer is a thermoplastic photo-sensitive amorphous molecular semiconductor film made of a matrix, which has donor properties and forms transport bands for holes.

So Patents and publications disclosing methods for recording and reproducing holograms are based on materials with special light-sensitive characteristics. One of the purposes of the present invention is the disclosure of a method for recording and reproducing holograms inside ordinary transparent materials without special light sensitive characteristics by using small laser-induced damages.

SUMMARY OF THE INVENTION

The present invention has its principal task to provide a method and apparatus for recording and reproducing holograms inside ordinary transparent materials without special light sensitive characteristics by using special arrangements of laser-induced damages.

One or more embodiments of the invention comprise a method for transformation of an interference pattern into an arrangement of points so as these points keep information containing in this interference pattern and all these points can be produced inside transparent materials without internal split of the material.

One or more embodiments of the invention comprise a method for production of holograms by generating special arrangement of breakdowns inside transparent material.

One or more embodiments of the invention comprise a method for controlling sizes of laser-induced damages by transforming wave—length of laser radiation used for generating breakdowns at the predetermined points of transparent materials.

One or more embodiments of the invention comprise a method for producing laser-induced images together with interference pattern inside the same transparent material so that the interference pattern creates additional holographic image or iridescent (color) effect as a result of illuminating the said transparent material.

One or more embodiments of the invention disclose a laser-computer system for recording and reproducing holograms inside ordinary transparent materials by using special arrangements of laser-induced damages.

DETAILED DESCRIPTION OF THE INVENTION

Figure 1:
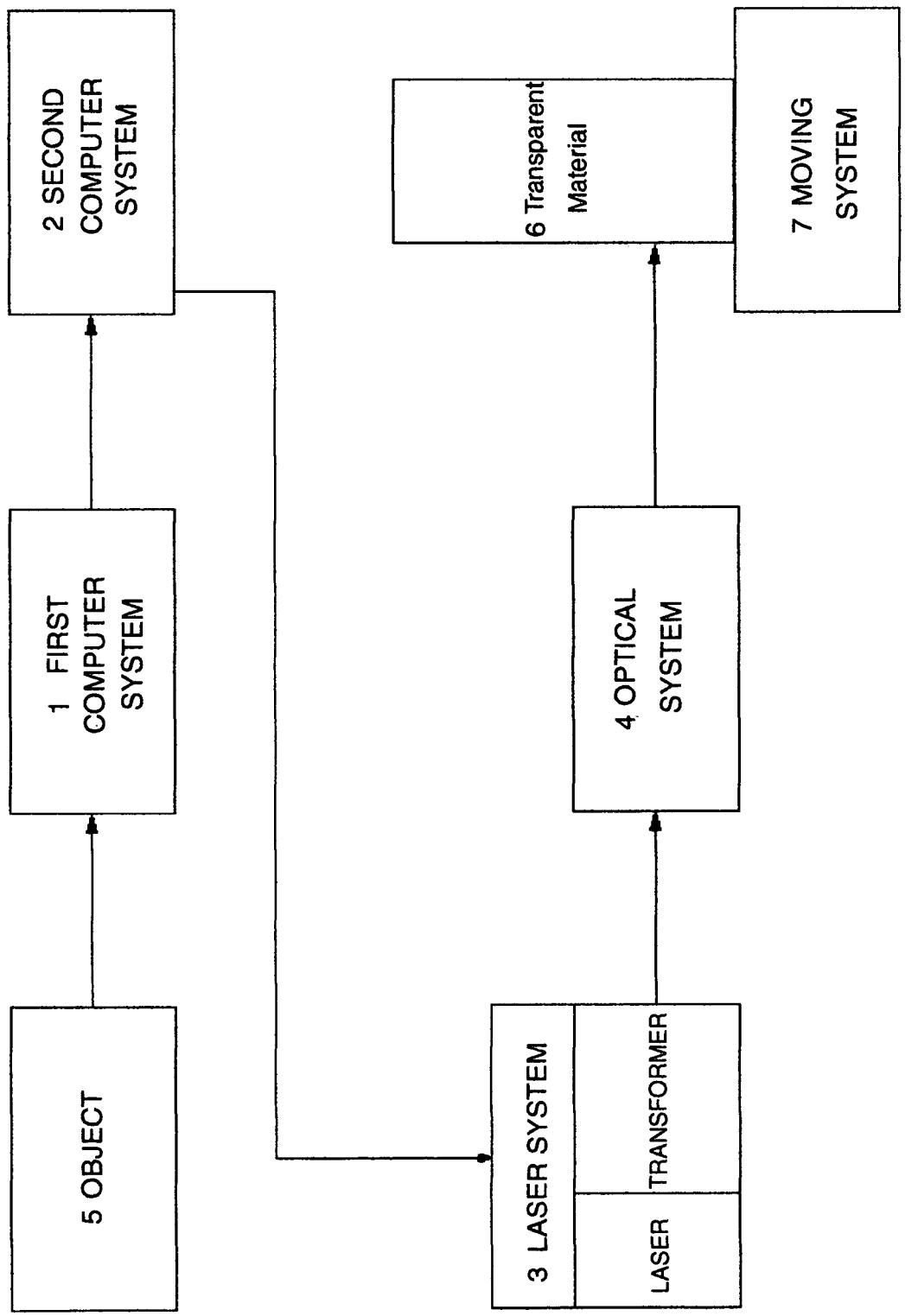
FIG. 1 is an exemplary block-diagram of a laser-computer system of the invention for production of holograms by an arrangement of laser induced damages.

A hologram is a stored interference pattern formed by the combining of the two wave fronts: reflected light from an object and a reference beam. When a hologram is illuminated with a light beam, the wave is reconstructed in practically its original form, so that when the eye perceives the reconstructed wave, the visual sensation is virtually the same as it would be if the object itself were observed.

A hologram is a stored interference pattern, which is a system of alternating straight maximum and minimum of the light intensity, described by function J(x, y, z), where x, y, z are coordinates of an area, in which a reference and object beams are superposed. If an interference pattern is formed on a light-sensitive plate (or film), and the plate is developed then the transparency of the plate becomes proportional to the function J(x, y, z). Another way of creating a hologram is the calculation of an interference pattern (i.e. function J(x, y, z)) and production of the material with the transparency, which is proportional to the interference pattern (in other words, the transparency should be described by the function J(x, y, z)). Illuminating this material, we can also reconstruct an image of an object.

One or more embodiments of the invention comprise a method for creating an arrangement of laser-induced damages, which reproduce given interference pattern inside ordinary transparent material, which does not have special light-sensitive characteristics. It is possible, because a laser-induced damage is a small region of a transparent material, which reflects the light. As a result of this, the intensity of light reflected by an illuminated transparent material area depends on the number of laser-induced damages inside the area. So transparent material containing arrangement of laser-induced damages being illuminated with light works like transparent material with transparency corresponding an interference pattern. Consequently, we can reproduce an interference pattern inside a transparent material by arranging laser-induced damages inside the transparent material so that their density is described by function J(x, y, z). In this case, illuminating transparent material containing such arrangement of laser-induced damages, we can reconstruct the image.

So laser-induced hologram is a plurality of laser-induced damages inside a transparent material created by a pulsed laser beam, which is periodically focused at predetermined points. The density of these damages corresponds to the intensity of the interference pattern.

One method for creating damage arrangement with density corresponding to the function J(x, y, z) is based on the division of the transparent material area into N regions $\Omega_1 \ldots \Omega_N$. Then the number of laser-induced damages, which should be produced inside each region $\Omega$ is equal to the triple integral of J(x, y, z) over the area $\Omega$:

$$n = \int\int\int_{\Omega} J(x, y, z)\,dx\,dy\,dz.$$

A method creating a hologram, which is based on the division of the transparent material area into N regions $\Omega_1 \ldots \Omega_N$ comprises:

calculation of function J(x, y, z), which describes interference pattern corresponding to the given object;

division of the transparent material area into N regions $\Omega_1 \ldots \Omega_N$, so that the approximation of the function J(x, y, z) by the corresponding triple integral of J(x, y, z) over these areas is enough accurate;

calculation of the maximum number of laser-induced damages, which can be produced inside area $\Omega$ without internal split of the transparent material;

determination of the numbers of laser-induced damages for each region $\Omega_n$ so that these numbers are smaller than the maximum number estimated on the previous step;

determination of damage coordinates so that the damages are located inside each region $\Omega_n$ uniformly;

focusing laser radiation at the predetermined points of the transparent material and generating breakdowns at these points.

Another method for creating damage arrangement with density corresponding to the function J (x, y, z) is based on the interpretation of the damage arrangement as a set of random points, coordinates of which x, y, z are random variables with probability density function P (x, y, z), which is equal to the normalized function J(x, y, z), i.e.:

$$P(x, y, z) = J(x, y, z) \bigg/ \int\int\int_\Omega J(x, y, z)\, dx\, dy\, dz.$$

In this case, the coordinates $r_k$ ($X_k$, $Y_k$, $Z_k$) of points, at which the breakdowns should be produced, are determined as a result of n independent trials with possible outcomes determined by probability density function P (x, y, z). Each following value $r_k$, appeared as a result of the next trial, is compared with the values of r, which were received at previous trials: the point with coordinates $r_k$ is included in the point arrangement only if the distances between this point and all adjacent points received at previous trials are not smaller than the minimal value $d_o$ ($d_o$ is minimal distance between points inside the transparent material when the internal crash of the material does not happened).

It is obvious, that the quality of interference pattern depends on the total number of laser-induced damages: larger total number of damages gives higher quality of image reconstructed from this interference pattern. Essential total number of damages can be calculated (please, see example 1) or determined as a result of experiment.

The method for creating spatial damage arrangement based on independent trials comprises:

calculation of function J(x, y, z), which describes interference pattern corresponding to the given object;

determination of the number n of laser-induced damages, which are needed for reproduction of high quality interference pattern;

determination of coordinates of points at which breakdowns should be generated by production of independent trials with possible outcomes r=(x, y, z) described by probability density function P (x, y, z);

construction of the point arrangement from random points so that distance between adjacent points is not smaller than minimal distance;

focusing laser radiation at the predetermined points of the transparent material for the purpose of generation of breakdowns at these points.

EXAMPLE

First of all we should remark that all further assumptions used in this example are not of basic nature and are made only to avoid unwieldy expressions. Assume that interference pattern is located in the plane with coordinates x, y and described by the function J(x, y):

$$J(x, y) = |U(x, y)|^2 + |U_0(x, y)|^2 + U_0(x, y)U^*(x, y) + U^*_0(x, y)U(x, y),$$

where $U_o$ (x, y) is a complex amplitude of given object, and U (x, y) is a complex amplitude of a reference wave.

After transformation of holographic interference pattern into set of points with coordinates $r_k=(X_k, y_k)$ (k=1, ..., n) and production of laser-induced damages at the points, we can describe the interference pattern by the function:

$$G(x, y) = \sum_{k=1}^{N} G_k \mu(x - x_k, y - y_k),$$

where $G_k$ is the brightness value of a damage k and function $\mu(x-x_k, y-y_k)$ describes geometric structure (a shape) of damage k.

Let us assume that the image is reconstructed by a wave, which is an exact copy of the reference wave U (x, y) and the image itself is formed in the Fraunhofer zone (reconstructed plane with coordinates $\xi$, $\eta$. The reference wave is a plane wave with a wave vector inclined at an angle $\Phi$ to the z axis, so that $U(x, y)=\exp(-i2\pi\beta y)$ where $\beta=\sin(\Phi/\lambda)$, $\lambda$ is wave length. If laser-induced damages are small damages then $\mu(x-x_k, y-y_k)$ is $\delta$—function and the intensity of reconstructed image is described by $$I(\xi, \eta) \approx \sum_{k=1}^{n} G_k \exp(-i\psi\xi x_k - i(\psi\eta + 2\pi\beta)y_k),$$

where $\psi=2\pi/\lambda z_o$, $z_o$ is the distance from the hologram to the reconstructed—image plane.

Using function I ($\xi$, $\eta$), we can find the average value and the standard deviation of the intensity of the reconstructed image. Analyzing these values, it is possible to determinate total number of laser-induced damages needed for recording interference pattern to reconstruct high quality holographic image. Indeed, the quality of reconstructed image is higher, when the ratio of average value of its intensity to the standard deviation of the intensity is smaller.

The quality of reconstructed image depends on both the total number of laser-induced damages forming an interference pattern, and the sizes of these damages: smaller adjacent damages has smaller minimal distance between them, therefore using smaller damages it is possible to produce greater number of damages per unit square and thereby increase the hologram effectiveness. Using the larger number of laser-induced damages per unit square, it is possible also to improve approximation of the function J(x, y, z) by the arrangement of these damages.

One or more embodiments of the invention comprise a method for controlling (and in particular, decreasing) sizes of laser-induced damages by controlling the value of the wave length of the laser radiation generating breakdown. Although the sizes of laser-induced damage are larger than the sizes of the focal point, it is very important to note that the sizes of laser-induced damage is proportionate to the sizes of focal point: smaller focal point provides smaller laser-induced damage. It is known that using the same lens and modifying the length of light wave, we have different sizes of focal point: radiation with smaller wavelength provides smaller focal point. Hence, varying the wavelength of the laser radiation generating breakdowns, we can control the sizes of laser-induced damages.

For example, laser-induced damages produced by the same Nd-YAG (neodymium-yttrium-aluminum garnet)

laser, which can generate first and second harmonics have different sizes: laser-induced damages produced by the second harmonic (wavelength is 530 nm) are smaller than the damages produced by the first harmonic (wavelength is 1060 nm). Taking into account that the damage arrangement corresponding to hologram should have great number of points it is necessary to use laser with high pulse repetition. From this point of view the more proper lasers, which can be used for production of laser-induced holograms, are diode-pumped solid-state lasers. So for previous example, it is reasonable for production of large number of laser-induced damages to use the diode-pumped Nd-YAG laser.

Method for controlling sizes of laser-induced damages by transforming wavelength of laser radiation generating breakdowns at the predetermined points of transparent materials comprises:

determination of functional dependence of damage sizes from sizes of focal point for given transparent material;
  determination of sizes of laser-induced damages suitable for production interference pattern inside transparent material;
  determination of focal point sizes corresponding to demanded damage sizes;
  transformation of laser radiation so that it has the wavelength corresponding demanded damage sizes;
  generating laser radiation of determined wavelength and focusing the transformed laser radiation at the predetermined points of transparent material to generate laser-induced breakdowns.

One or more embodiments of the invention comprise a method for combined production of laser-induced image and hologram that gives a chance to realize new visual effects.

One or more embodiments of the invention comprise a method for production of interference pattern on the side of laser-induced image. Usually, laser-induced image has sides, which are arrangements of damages. If these arrangements of points (or one of them) are replaced by the damage arrangements corresponding interference patterns, then it is possible, illuminating the laser-induced image to reconstruct holographic images. It is also possible to replaced said damage arrangements by the damage arrangements corresponding to interference pattern describing diffraction grating (or iridescent hologram). As a result, illuminating the laser-induced image, we see this image and an iridescent picture simultaneously.

For example inscription (or an image) formed by laser-induced damages looks as arrangement of light points. If the arrangement of the damages corresponds to the diffraction grating (or iridescent hologram), the inscription is read on iridescent background.

One or more embodiments of the invention comprise a laser-computer system for production of hologram by arrangement of laser-induced damages. This system comprises:

computer system(1) for calculation of interference pattern, corresponding given object(5);
  computer system(2) for transformation of the said interference pattern into arrangement of points, so that laser-induced damages, created at these points, are able to reconstruct high quality holographic image without internal split of transparent material(6);
  laser system(3) for generating laser radiation to creation of laser-induced damages of demanded sizes;
  optical system(4) and moving system(7) for focusing laser radiation at the predetermined points of the transparent material to produce the breakdowns at these points.

The general advantages of the production of holograms by using arrangements of laser-induced damages are:

the area, inside of which the interference pattern is created, is not restricted by light sensitive layer (in particular, photographic emulsion) and can occupy the area of all 3D transparent material;
  the material, inside of which an interference pattern is created, can be ordinary transparent material without special light-sensitive characteristics;
  the control of each laser-induced damage (its position, sizes, brightness and others its characteristics) by particularly;
  combined production of laser-induced images and holograms what gives new visual effects.

I claim:

1. A method for producing laser-induced holograms inside transparent materials by using laser-induced damages comprising:

calculation of an interference pattern, corresponding to a given object;
  transformation of the interference pattern into arrangement of points so that laser-induced damages created at the points are able to reconstruct a high quality holographic image;
  generating and focusing laser radiation at the points of the transparent material corresponding to the points of the said arrangement so that the marks generated as a result of the interaction of laser radiation with the material are created.

2. The method in accordance with claim 1 further comprising creation of an arrangement of laser-induced damages wherein the coordinates of points, at which the breakdowns should be produced, are determined as a result of independent trials with possible outcomes described by probability density function, which is proportional to the intensity of corresponding interference pattern.

3. The method in accordance with claim 1 further comprising creation of an arrangement of laser-induced damages, which being illuminated, reconstruct the holographic image of the object.

4. The method in accordance with claim 1 further comprising the transformation of the interference pattern into damage arrangement by the division of the transparent material area into several regions and production of laser-induced damages inside the regions so that said damages approximate the interference pattern.

5. The method in accordance with claim 1 including creation of combined arrangement of laser-induced damages, which provide both reproduction of laser-induced images and reconstruction of laser-induced holograms inside transparent materials.

6. The method in accordance with claim 5 further comprising production of an interference pattern on at least one side of a transparent material containing a laser-induced image.

7. The method in accordance with claim 5 further comprising production of iridescent background by creating an arrangement of the damages corresponding to a diffraction grating or an iridescent hologram.

8. Method for production of small laser-induced damages by controlling and transforming wavelength of laser radiation generating breakdowns at the predetermined points of transparent materials, comprising:

determination of functional dependence of damage sizes from sizes of focal point for given transparent material;

determination of focal point sizes corresponding to damage sizes;

transformation of laser radiation so that it has the wavelength corresponding to demanded damage sizes;

generating laser radiation of determined wavelength and focusing the transformed laser radiation at the predetermined points of transparent material to generate laser-induced breakdowns.

9. Laser-computer system for production of laser-induced holograms inside transparent materials comprising:

a first computer system for calculation of an interference pattern, corresponding to a given object;

a second computer system for transformation of the said interference pattern into an arrangement of points, so that laser-induced damages, created at the points, are able to reconstruct a high quality holographic image without internal split of the transparent material;

a laser system for generating laser radiation to create laser-induced damages of demanded sizes;

optical and moving systems for focusing laser radiation at the predetermined points of the transparent material to produce the breakdowns at the points.

10. The controlling system which in accordance with claim 9, controls a laser system for generating radiation with the wavelength corresponding to the needed sizes of laser-induced damages.

11. The system of claim 9 wherein the laser system generates a harmonic of the fundamental wavelength produced by the laser and transforms of the radiation into a second or higher harmonic to create laser-induced damages inside the transparent material.

12. The laser system in accordance with claim 11 further comprising a diode-pumped ND:YAG laser generating radiation for creating laser-induced marks inside transparent materials.

* * * * *